Oct. 20, 1959 G. H. BABYAK 2,909,328
IRRIGATING COPING FOR GARDENS
Filed April 12, 1957
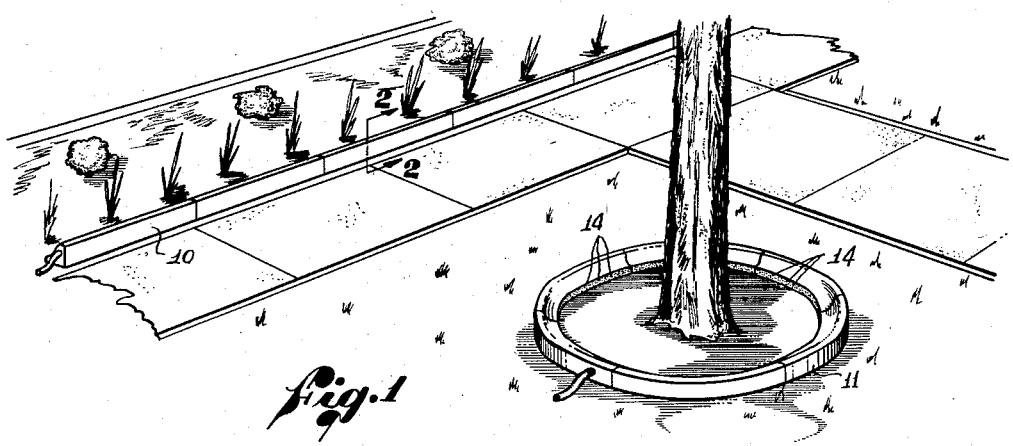
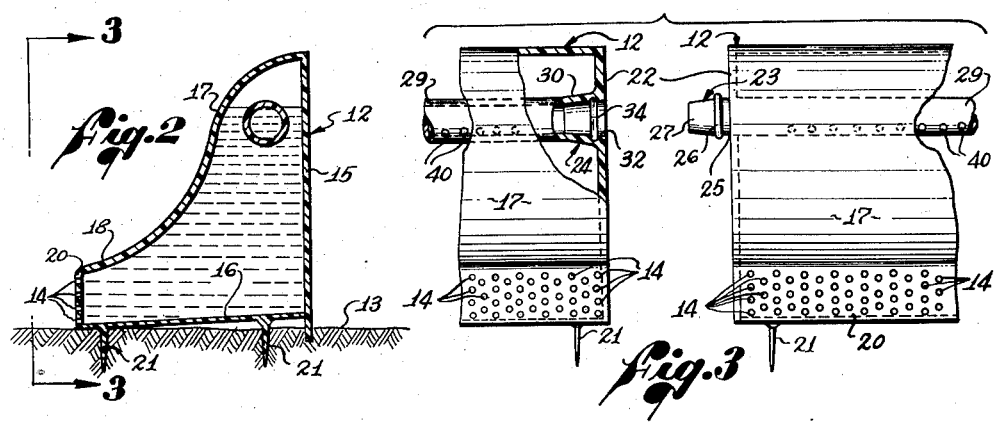
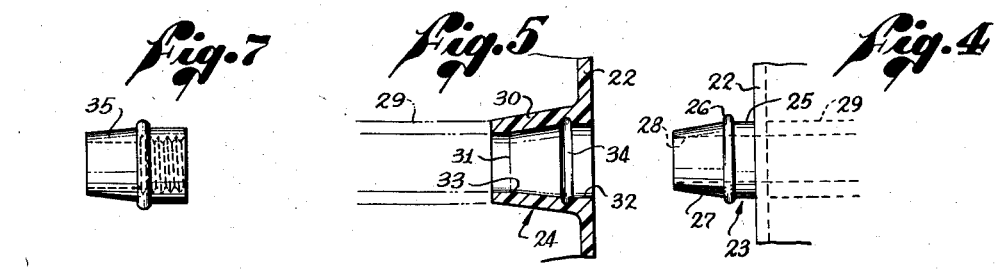
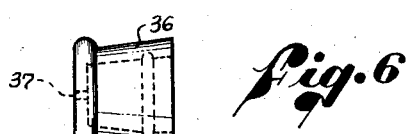
INVENTOR.
GEORGE H. BABYAK
BY Fulwider Mattingly & Huntley
Attorneys United States Patent Office 2,909,328
Patented Oct. 20, 1959

2,909,328

IRRIGATING COPING FOR GARDENS

George H. Babyak, Van Nuys, Calif.

Application April 12, 1957, Serial No. 652,397

5 Claims. (Cl. 239—268)

This invention relates generally to irrigation devices, and more particularly to a coping or curb to be installed in a garden or lawn to act as a separation member between various areas of the garden, while at the same time providing means for irrigating the same.

It has long been the practice to separate various areas in a garden by means of rocks, bricks, or other suitable means arranged to form a boundary between the particular area and adjacent areas. Thus, the lawn is often separated from a flower bed by a brick coping or curb, and the space adjacent the base of a tree is often separated from the lawn in the same general manner. It frequently happens that the problems of irrigating or watering the various areas are different, since one area may require more or less water, or that particular area may be more difficult to reach with the conventional available equipment. The present invention is concerned with a curb or coping that acts to separate adjacent areas of a garden, and at the same time provides a means of irrigating one of these areas.

It is a major object of this invention to provide a garden coping or curb that is particularly adapted to aid in the irrigation of a portion of the garden.

Another object of the invention is to provide such a device that can be made in a variety of materials and shapes to meet the aesthetic and physical requirements of different installations.

It is a further object of the invention to provide such a device that can be installed and used by a person having no special training, so that the device may be quickly and easily installed by the average homeowner.

Still another object of the invention is to provide a device of this type that functions effectively both as a curb, to reduce the spreading of plant growth from one side of the coping to the other, and as an irrigating device, to ensure the proper and thorough irrigation of the plants.

It is a still further object of the invention to provide such a device that can easily and inexpensively be made in large quantities from readily available materials, such as certain of the plastics.

These and other objects and advantages of the invention will become apparent from the following description of a preferred form thereof, and from the drawings illustrating that form in which:

Figure 1 is a fragmentary perspective view of a garden with the improved copings installed, with the method of irrigation clearly indicated;

Figure 2 is an enlarged cross sectional view of one of the curb or coping elements, taken on the line 2—2 of Figure 1;

Figure 3 is an elevational view of the front or irrigation side of two adjacent coping elements about to be connected together, taken on the line 3—3 of Figure 2, one of the elements being broken away to show the coupling member;

Figure 4 is an enlarged elevational view of the male coupling unit attached to one end of a coping element, this element being shown to a reduced scale in Figure 3;

Figure 5 is a cross sectional view of the female coupling element formed in one end of a coping element and adapted to receive the male connector unit shown in Figure 4;

Figure 6 is an elevational view of a cap or obscure member adapted to fit on an unconnected male coupling element; and Figure 7 is an elevational view of a coupling member adapted to fit within a female coupling element and receive the male connector of a common garden hose.

Briefly, the coping of the present invention consists of a series of interconnected hollow units of either straight or curved configuration for assembly into curbs or copings of various patterns. Thus, straight units may be interconnected to form a straight coping, such as might extend along an area in front of a house, and curved units may be interconnected to form a circle which might be placed around a tree. An example of the first style is indicated by the numeral 10 of Figure 1, while an example of the second or curved style is indicated by the numeral 11. In cross sectional form, as shown in Figure 2, the individual coping elements are seen to consist of a generally L-shaped housing or shell 12 with a generally vertical section extending from a position on or slightly below the surface of the ground 13 to a point several inches above the ground. The base or horizontal section of the L is preferably located on the surface of the ground 13 and at its forward end, remote from the vertical leg, is provided with a series of small holes 14 through which water may be discharged from the interior of the shell to the surrounding ground.

Preferably, the shell 12 is formed of a tough and impervious plastic, such as is commonly used in the manufacture of garden hose. A shell 12 may thus be molded or extruded, and if desired, two or more sections may be joined together to form a completed structure.

Each coping element 12 includes a generally vertical wall 15 connected at its lower end to a bottom wall 16, and the vertical wall may extend below the bottom wall, as shown, to aid in anchoring the coping elements and to discourage plant growth from creeping under the coping elements. At its upper end, the vertical wall 15 is connected to a forward wall 17 that is preferably curved in the general form of the letter S to provide a top for the shell 12, a portion of the forward surface thereof, and a generally ledge-like section 18 near the lower end of the shell 12. A perforated wall 20, which has the irrigating apertures 14 therein, extends from the forward edge of the front wall 17 to the forward edge of the lower wall 16. Preferably, the bottom wall 16 is provided with small spikes or points 21 to aid in the alignment of the shells 12 when they are being installed. These spikes 21 and the ridge or extension of the rear wall 15 anchor the shells 12 so that the entire curb or coping remains fixed in place while cultivating and other garden work goes on about it. The bottom wall 16 preferably has its upper surface sloping toward the perforated wall 20 so that gravity will assist in draining most, if not all, of the water out of the shell 12.

Each end of the shell 12 is closed by a generally vertical wall 22, and each of these end walls is provided with a coupling member. Since the coupling members must interconnect, the coupling member on one end of the coping element 12 is a male coupling member 23, while the corresponding coupling member on the opposite end of the element is a female coupling member 24. By constructing all of the various coping elements in this fashion, when the various elements are properly aligned, a male coupling member 23 will be adjacent a female coupling member 24 so that two adjacent coping elements 12 may be quickly and easily interconnected. The relative location of two such coping elements 12 just prior to their interconnection is indicated in Figure 3.

An enlarged view of the male coupling element 23 is shown in Figure 4, where it is seen to consist of a generally tubular member 25 projecting generally perpendicularly from the end of wall 22 and provided with an annular bead or flange 26. From the bead 26, the exterior of the tubular member 25 is tapered to form a frustum 27 of a cone. An axial passageway 28 extends through the entire coupling member 23, to connect to the interior of the coping element 12, either directly or through an auxiliary conduit 29, hereinafter described.

The female coupling element 24 is shown in cross section in Figure 5. The female coupling element 24 is mounted on an end wall 22 of the coping element 12, and extends inwardly into the interior of that coping element. Essentially, the female coupling member 24 consists of a boss or tubular member 30 that may have a generally tapered exterior surface, with its interior surface shaped complementary to the exterior surface of the male coupling member 23. Thus, the axial passageway 31 extending through the female coupling member 24 may include a generally cylindrical portion 32 adjacent the exterior of the end wall 22 and a generally tapered section 33 extending to the interior end of the coupling member. Between the cylindrical section 32 and the tapered section 33 is a groove 34 adapted to receive the bead 26 of the male coupling member 23.

If the coping elements 12 are formed of a plastic material, as suggested, the male and female coupling members 23 and 24 may likewise be formed of the same material, in which case there will normally be enough resilience of these coupling members to permit their ready engagement and disengagement, while still retaining the coping elements in abutting relationship, and preventing the leakage of large quantities of water between them. If the coping elements 12 are formed of a more rigid material, other suitable forms of coupling members, well known in the art, may be used.

Normally, it is contemplated that a garden hose will be used to fill the coping elements 12. This can readily be accomplished by providing the end of the hose with a coupling member 35 (shown in Figure 7) generally similar to the male coupling member 23, and inserting this member into the female coupling member 24 on one end of the coping. The opposite end of the coping, which has an unconnected male coupling member 23, may be provided with a cap 36 for that coupling member, the cap preferably having a very small opening 37 therein to permit the escape of air from the interior of the coping elements 12. With the hose thus connected to the coping, water flows into the first coping element 12 and substantially fills that element before the water reaches the coupling member 23 and is discharged into the second coupling element. As water continues to flow into the coping element 12, a certain amount of water is discharged through the apertures, but in general, water flows into the element faster than it is discharged through the apertures. As a result, the water level within the element rises until the passageway 28 through the coupling member 23 is substantially submerged. This condition is indicated in Figure 2, and it will be noted that there is a slight amount of air space above the surface of the water. However, this is a matter of little importance in the filling of the various coping elements.

After the first coping element 12 is substantially filled, as just described, the second element is then filled in a similar manner. This process is repeated until the final element in the line is filled. At that time, a small amount of water will be discharged through the opening in the cap covering the final coupling member. If the hose is not turned off, water in the coping element 12 will then be placed under pressure, and an increased discharge through the apertures 14 will occur. However, these apertures are of a relatively small size, and normally any water pressure that is likely to be applied to the coping elements 12 will not be sufficient to cause a jet action that will erode and wash away the soil adjacent the apertures 14. If the hose is removed, or if the water supply is merely turned off, the water then in the coping elements 12 will drain off through the apertures 14 by gravity. In either event, the soil in front of the coping elements 12 will be watered, as is desired.

With the construction and operation thus defined, it will be appreciated that the coping element 12 nearest the hose or other source of water will be filled before the most remote element receives any water. If the coping 10 is a long one, composed of many elements 12, comparatively little irrigation will be had at the remote end of the coping, while the garden area nearest the hose may be flooded. This problem can be overcome by incorporating an auxiliary conduit 29 within the individual coping elements 12. The auxiliary conduit 29 extends from the coupling member 23 at one end of the coping element 12, to the coupling member 24 at the other end of the element. Openings 40 are formed in the conduit 29 to discharge a portion of the water delivered to the conduit, into the coping element 12. Thus, when water is delivered from the hose, the conduits 29 are almost immediately filled along the entire length of the coping 10. Thereafter, water is discharged from the apertures 40 along the entire length of the coping 10, and this water, distributed among all of the coping elements 12, then is discharged from the apertures 14 of each of the coping elements. In this way, irrigation along the entire length of the coping 10 is substantially uniform.

In the case of arcuate or curved coping elements, such as indicated by the numeral 11 in Figure 1, it will be appreciated that a closed loop is formed by the coping elements, and consequently it is not practical to attempt to connect the supply hose to one end of the coping. Consequently, a suitable hose coupling is preferably located on the rear wall 15 of one of the coping elements 12, and if desired, a vent hole for the escape of entrapped air may be provided on one of the opposite coping elements.

It will be appreciated that straight and curved coping elements 12 may be combined to produce desired effects, and that the curved elements may be given a double curve, comparable to the letter S, and the curved elements may be made with various radii, of various arcs, and with similar variations. Likewise, the various coping elements 12 may be made of different materials and different colors, and may be given any desired surface treatment to improve the appearance of the resulting device.

From the foregoing, it will become apparent that the invention disclosed herein is fully capable of achieving the objects and securing the advantages heretofore set forth. Modifications such as those discussed may be made in the device, and fall within the broad concept of the invention. Consequently, the invention is not to be restricted to the particular form or arrangement of parts herein described and shown, except as limited by the claims.

I claim:

1. An irrigating coping unit of the class described which includes: an elongated hollow shell having a bottom wall, a rear wall, a forward wall having irrigating apertures therein, wall means connecting said forward and rear walls, end walls, spikes on the lower surface of said shell adapted to engage the ground, and a longitudinally extending ridge on the lower surface of said shell adapted to engage the ground, the upper surface of said bottom wall sloping toward said forward wall; a first coupling member in one of said end walls providing a passageway into the interior of said shell, whereby fluid may pass through said coupling into the interior of said shell, at least a portion of the fluid so entering being discharged through said irrigating apertures in said shell; a second fluid coupling member in the other of said end walls of said shell providing a passageway from the interior of said shell, said first and second coupling members being cooperable with coupling members of adjoining coping units to hold said units together and adjacent each other, said coupling members acting to provide a passageway from the interior of one unit to the interior of the adjacent unit, whereby at least a portion of the fluid entering a coping unit through said first coupling member will be discharged through said irrigating apertures, and the remainder of the fluid will be discharged through said second coupling member of said coping unit into an adjacent coping unit.

2. An irrigating coping unit as defined in claim 1 having an auxiliary conduit extending from said first coupling member to said second coupling member, said auxiliary conduit having an opening therein adapted to discharge a portion of the fluid entering through said first coupling member into said unit while the remainder of said fluid is carried by said auxiliary conduit to said second coupling member for discharge into an adjacent coping unit.

3. An irrigating coping unit of the class described which includes: an elongated hollow shell adapted to be anchored to the ground, said shell having a series of discharge openings located in a portion of said shell that extends in the direction of elongation thereof, said discharge openings establishing communication between the interior and exterior of said shell; a first coupling member in one end of said shell providing a passageway into the interior of said shell, whereby fluid may pass through said coupling member into said shell and be discharged through said discharge openings; a second coupling member in the other end of said shell providing a passageway from the interior of said shell, said first and second coupling members being cooperable with coupling members of adjoining coping units to hold said units together adjacent each other, and acting to provide a continuous passageway from the interior of one unit to the interior of the adjacent unit, whereby fluid entering a coping unit through said first coupling member will be discharged through said discharge openings in said unit and through said second coupling member into an adjacent coping unit; and an auxiliary conduit extending from said first coupling member to said second coupling member, said auxiliary conduit having an opening therein adapted to discharge a portion of the fluid entering through said first coupling member into said unit while the remainder of said fluid is carried by said auxiliary conduit to said second coupling member for discharge into an adjacent coping unit.

4. An irrigating coping unit of the class described which includes: an elongated hollow shell adapted to be anchored to the ground, said shell having a bottom wall with spikes thereon adapted to engage the ground, a rear wall, a forward wall having irrigating apertures therein, wall means connecting said rear and forward walls, and end walls; a first coupling member in one of said end walls providing a passageway into the interior of said shell, whereby fluid may pass through said coupling into the interior of said shell, at least a portion of the fluid so entering being discharged through said irrigating apertures in said shell; a second fluid coupling member in the other of said end walls of said shell providing a passageway from the interior of said shell, said first and second coupling members being cooperable with coupling members of adjoining coping units to hold said units together and adjacent each other, said coupling members acting to provide a passageway from the interior of one unit to the interior of the adjacent unit, whereby at least a portion of the fluid entering a coping unit through said first coupling member will be discharged through said irrigating apertures, and the remainder of the fluid will be discharged through said second coupling member of said coping unit into an adjacent coping unit; and an auxiliary conduit extending from said first coupling member to said second coupling member, said auxiliary conduit having an opening therein adapted to discharge a portion of the fluid entering through said first coupling member into said unit while the remainder of said fluid is carried by said auxiliary conduit to said second coupling member for discharge into an adjacent coping unit.

5. An irrigating coping unit of the class described which includes: an elongated hollow shell adapted to be anchored to the ground, said shell having a bottom wall with spikes thereon adapted to engage the ground, a rear wall, a forward wall having irrigating apertures therein, wall means connecting said rear and forward walls, and end walls, the bottom of said shell also having a longitudinally extending ridge adapted to enter the ground and cooperate with said spikes to retain said shell in position; a first coupling member in one of said end walls providing a passageway into the interior of said shell, whereby fluid may pass through said coupling into the interior of said shell, at least a portion of the fluid so entering being discharged through said irrigating apertures in said shell; and a second fluid coupling member in the other of said end walls of said shell providing a passageway from the interior of said shell, said first and second coupling members being cooperable with coupling members of adjoining coping units to hold said units together and adjacent each other, said coupling members acting to provide a passageway from the interior of one unit to the interior of the adjacent unit, whereby at least a portion of the fluid entering a coping unit through said first coupling member will be discharged through said irrigating apertures, and the remainder of the fluid will be discharged through said second coupling member of said coping unit into an adjacent coping unit.

References Cited in the file of this patent

UNITED STATES PATENTS

| 648,263 | Hull | Apr. 24, 1900 |
| 802,772 | McCoy | Oct. 24, 1905 |
| 980,355 | Spencer | Jan. 3, 1911 |
| 2,809,867 | Dupasquier | Oct. 15, 1957 |

FOREIGN PATENTS

| 514,178 | Germany | Dec. 9, 1930 |